United States Patent
Kuo et al.

(10) Patent No.: US 11,619,997 B1
(45) Date of Patent: Apr. 4, 2023

(54) TOUCH MODULE WITH MAGNET AND MAGNETIC COIL TO GENERATE VIBRATION

(71) Applicant: Primax Electronics Ltd., Taipei (TW)

(72) Inventors: Hung-Wei Kuo, Taipei (TW); Tse-Ping Kuan, Taipei (TW); Ying-Yen Huang, Taipei (TW); Wei-Chiang Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/867,379

(22) Filed: Jul. 18, 2022

(30) Foreign Application Priority Data

Jun. 22, 2022 (TW) .................................. 111123270

(51) Int. Cl.
*G06F 3/01* (2006.01)
*G06F 3/0354* (2013.01)
(52) U.S. Cl.
CPC .......... *G06F 3/016* (2013.01); *G06F 3/03547* (2013.01)

(58) Field of Classification Search
CPC .... G06F 3/016; G06F 3/03547; G06F 3/0416; G06F 3/045; G06F 2203/04105; G06F 3/04144; G06F 3/04886
See application file for complete search history.

(56) References Cited

U.S. PATENT DOCUMENTS

2022/0011868 A1* 1/2022 Junus ...................... G06F 1/169

* cited by examiner

*Primary Examiner* — Rodney Amadiz
(74) *Attorney, Agent, or Firm* — Kirton McConkie; Evan R. Witt

(57) ABSTRACT

A touch module includes a base plate, a magnet, a touchpad and a magnetic board. The magnetic board includes a first wiring layer, a second wiring layer and a third wiring layer. The magnet is installed on the base plate. The touchpad is located over the base plate. The magnet is covered by the touchpad. The magnetic board is arranged between the touchpad and the magnet. The first wiring layer, the second wiring layer and the third wiring layer are in parallel with each other and stacked on each other. The second wiring layer is arranged between the first wiring layer and the third wiring layer. The first wiring layer is connected with the second sensing line through the third wiring layer. The first sensing line, the second sensing line and the third sensing line sense a magnetic field of the magnet and generates a vibrating effect.

13 Claims, 5 Drawing Sheets

TOUCH MODULE WITH MAGNET AND MAGNETIC COIL TO GENERATE VIBRATION

FIELD OF THE INVENTION

The present invention relates to a touch-type input device, and more particularly to a touch module.

BACKGROUND OF THE INVENTION

Conventionally, when a touchpad is pressed by the user, the touchpad provides an up/down swinging feel or a vibration feel to the user. The up/down swinging feel or the vibration feel can prompt the user that the pressing action is effectively performed on the touchpad and a pressing signal is generated. The up/down swinging effect or the vibration effect of the conventional touchpad is resulted from the elastic feedback of an elastic key. For example, a key switch or an elastic sheet is located under the touchpad. Due to the elasticity of the key switch or the elastic sheet, the touchpad generates the restoring vibration after the touchpad is pressed. Consequently, the touchpad correspondingly generates a swinging effect or a vibrating effect.

However, the conventional touchpad still has some drawbacks. For example, since the elastic key is located under the touchpad, the elastic key not only withstands the weight of the touchpad but also withstands the pressing force of the user. If the touchpad has been used for a long time, the elastic key is readily damaged. Moreover, due to the elastic fatigue or the structural friction abrasion, the vibration feedback of the touchpad is adversely affected, and the function of generating the pressing signal is possibly abnormal.

SUMMARY OF THE INVENTION

For solving the drawbacks of the conventional technologies, the present invention provides a touch module. The touch module includes magnetic coils and a magnet. When the magnetic coils sense a magnetic property (e.g., a magnetic field) of the magnet, the magnetic coils generate a vibrating effect. As the magnetic coils generate the vibrating effect, the touchpad is subjected to vibration, or the vibration is transmitted to the touchpad. Consequently, the user can feel the vibration feedback. The magnetic coils are stacked on each other in multiple layers. Moreover, the coils wound in separated wiring layers are connected with each other, and the winding directions of the coils in different layers are different. Since the layered winding structure of the magnetic coils is dense and fine, the magnetic coils can precisely sense the magnetic field of the magnet and generate the strong vibration. Moreover, since the coil layers are stacked closely, the coils are not readily damaged or subjected to deformation.

In accordance with an aspect of the present invention, a touch module is provided. The touch module includes a base plate, a magnet, a touchpad and a magnetic board. The base plate includes a top side. The magnet is located at the top side of the base plate. The touchpad is located over the top side of the base plate. The magnet is covered by the touchpad. The magnetic board is arranged between the touchpad and the magnet. The magnet is covered by the magnetic board. The magnetic board includes a first wiring layer, a second wiring layer and a third wiring layer. The first wiring layer is located beside the magnet. The first wiring layer includes a first sensing line. The first sensing line is wound in the first wiring layer in a first direction. The first sensing line includes a first contacting terminal and a first conducting terminal. The second wiring layer is located over the first wiring layer. The second wiring layer includes a second sensing line. The second sensing line includes a second contacting terminal and a second conducting terminal. The third wiring layer is located over the second wiring layer and located near the touchpad. The third wiring layer includes a third sensing line. The third sensing line is wound in the third wiring layer in a second direction. The third sensing line includes a third contacting terminal and a third conducting terminal. The first wiring layer, the second wiring layer and the third wiring layer are in parallel with each other and stacked on each other. The first wiring layer, the second wiring layer and the third wiring layer are aligned with the magnet. The first contacting terminal of the first sensing line is formed in the first wiring layer. The first conducting terminal of the first sensing line is connected with the third contacting terminal of the third sensing line such that the first sensing line is connected with the third sensing line. The third conducting terminal of the third sensing line is connected with the second contacting terminal of the second sensing line such that the third sensing line is connected with the second sensing line. The second conducting terminal of the second sensing line is formed in the second wiring layer. The first sensing line, the second sensing line and the third sensing line sense a magnetic field of the magnet and generates a vibrating effect.

In an embodiment, the first sensing line of the first wiring layer is connected with the third sensing line of the third wiring layer through the third sensing line of the third wiring layer.

In an embodiment, the first sensing line, the second sensing line and the third sensing line are in parallel with each other and stacked on each other, and the first sensing line, the second sensing line and the third sensing line are aligned with the magnet.

In an embodiment, the first contacting terminal and the first conducting terminal of the first sensing line are connected with each other through the first sensing line, the second contacting terminal and the second conducting terminal of the second sensing line are connected with each other through the second sensing line, and the third contacting terminal and the third conducting terminal of the third sensing line are connected with each other through the third sensing line.

In an embodiment, the first wiring layer further includes a first layer body, the second wiring layer further includes a second layer body, and the third wiring layer further includes a third layer body. The first layer body, the second layer body and the third layer body are in parallel with each other and stacked on each other. The first layer body is located beside the magnet. The third layer body is located beside the touchpad.

In an embodiment, the first sensing line is wound in the first layer body of the first wiring layer in the first direction, the third sensing line is wound in the third layer body of the third wiring layer in the second direction, and the second sensing line is wound in the second layer body of the second wiring layer in the first direction or the second direction.

In an embodiment, the second wiring layer further includes a second-layer connection part. The second-layer connection part is not connected with the second sensing line. The first conducting terminal of the first sensing line is connected with the third contacting terminal of the third sensing line through the second-layer connection part of the second wiring layer.

In an embodiment, the third wiring layer further includes a third-layer connection part. The third-layer connection part is not connected with the third sensing line. The second conducting terminal of the second sensing line is connected with the third-layer connection part.

In an embodiment, the top side of the base plate includes a concave structure, and the magnet is disposed within the concave structure.

In an embodiment, the base plate further includes a supporting part. The supporting part is installed on the top side of the base plate. The supporting part is contacted with the touchpad.

In an embodiment, the supporting part of the base plate includes a first supporting piece, a second supporting piece, a third supporting piece and a fourth supporting piece. The first supporting piece, the second supporting piece, the third supporting piece and the fourth supporting piece are installed on the top side of the base plate and arranged around the magnet.

In an embodiment, the magnetic board further includes a fourth wiring layer. The fourth wiring layer is located over the third wiring layer, the fourth wiring layer includes a fourth sensing line. The fourth sensing line includes a fourth contacting terminal and a fourth conducting terminal.

In an embodiment, the fourth wiring layer further includes a fourth layer body, and the fourth sensing line is wound in the fourth layer body in the first direction or the second direction.

In an embodiment, the fourth wiring layer further includes a fourth-layer connection part. The fourth-layer connection part is not connected with the fourth sensing line. The third conducting terminal of the third sensing line is connected with the second contacting terminal of the second sensing line through the fourth-layer connection part.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments and accompanying drawings.

Figure 1:
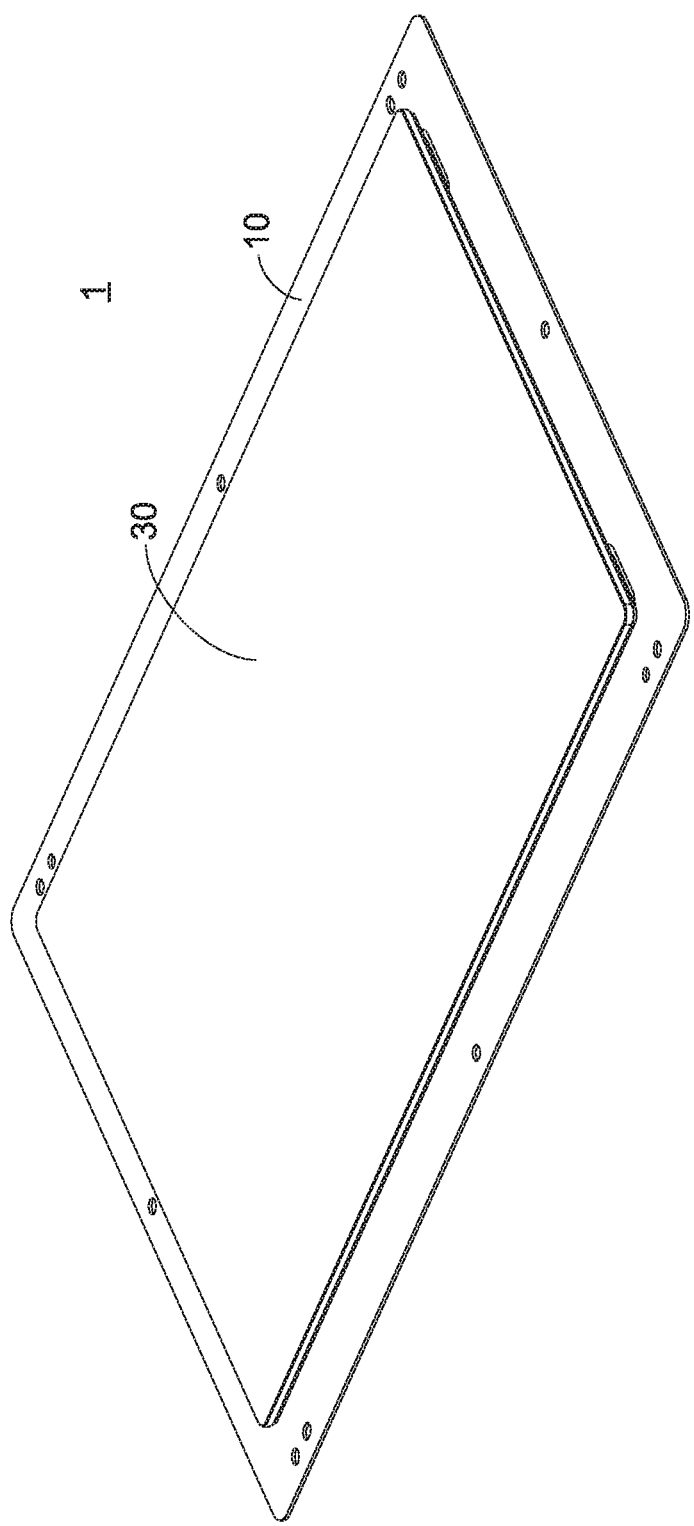
FIG. 1 is a schematic perspective view illustrating a touch module according to a first embodiment of the present invention.
Figure 2:
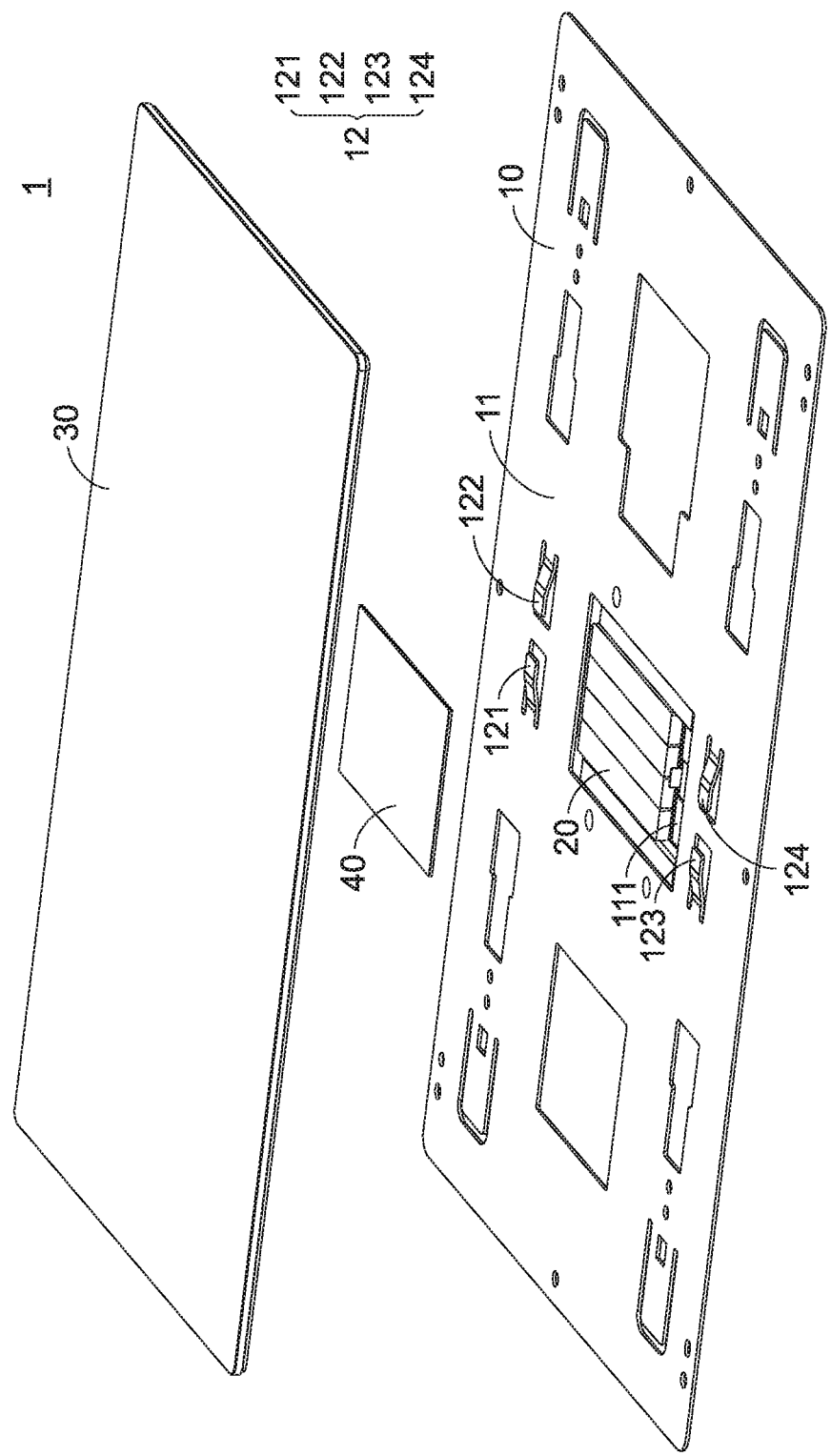
FIG. 2 is a schematic exploded view illustrating the touch module according to the first embodiment of the present invention.
Figure 3:
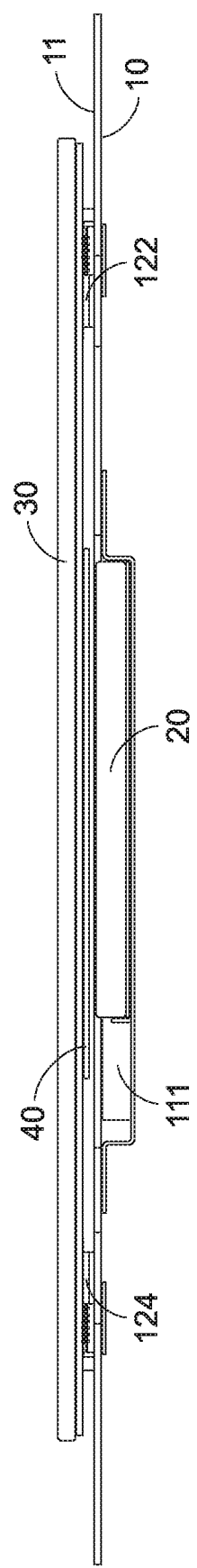
FIG. 3 is a schematic cross-sectional view illustrating the touch module according to the first embodiment of the present invention.

FIG. 1 is a schematic perspective view illustrating a touch module according to a first embodiment of the present invention. FIG. 2 is a schematic exploded view illustrating the touch module according to the first embodiment of the present invention. FIG. 3 is a schematic cross-sectional view illustrating the touch module according to the first embodiment of the present invention.

In the first embodiment, the touch module 1 comprises a base plate 10, a magnet 20, a touchpad 30 and a magnetic board 40.

The base plate 10 comprises a top side 11 and a supporting part 12. The top side 11 comprises a concave structure 111. The supporting part 12 comprises a first supporting piece 121, a second supporting piece 122, a third supporting piece 123 and a fourth supporting piece 124.

The magnet 20 is located at the top side 11 of the base plate 10. Moreover, the magnet 20 is disposed within the concave structure 111 of the top side 11. The supporting part 12 of the base plate 10 is installed on the top side 11. Moreover, the first supporting piece 121, the second supporting piece 122, the third supporting piece 123 and the fourth supporting piece 124 of the supporting part 12 are arranged around the periphery of the magnet 20.

The touchpad 30 is located over the top side 11 of the base plate 10. Moreover, the magnet 20 is covered by the touchpad 30. The supporting part 12 of the base plate 10 is contacted with the touchpad 30. That is, the first supporting piece 121, the second supporting piece 122, the third supporting piece 123 and the fourth supporting piece 124 of the supporting part 12 are contacted with the touchpad 30. Consequently, the touchpad 30 and the base plate 10 are separated from each other, and the touchpad 30 is movable relative to the base plate 10.

The magnetic board 40 is arranged between the touchpad 30 and the magnet 20. Moreover, the magnet 20 is covered by the magnetic board 40. The magnetic board 40 is electrically connected with the touchpad 30 or a processor (not shown). The touchpad 30 or the processor can provide electricity to the magnetic board 40 and control the magnetic board 40. In this embodiment, the magnetic board 40 is electrically connected with the touchpad 30. When the user's finger touches the touchpad 30, electricity flows through the magnetic board 40. Meanwhile, the magnetic board 40 senses the magnetic property (e.g., the magnetic field) of the magnet 20 and generates a vibrating effect. As the magnetic board 40 generates the vibrating effect, the touchpad 30 is subjected to vibration, or the vibration is transmitted to the touchpad 30. Consequently, the user can feel the vibration feedback.

Figure 4:
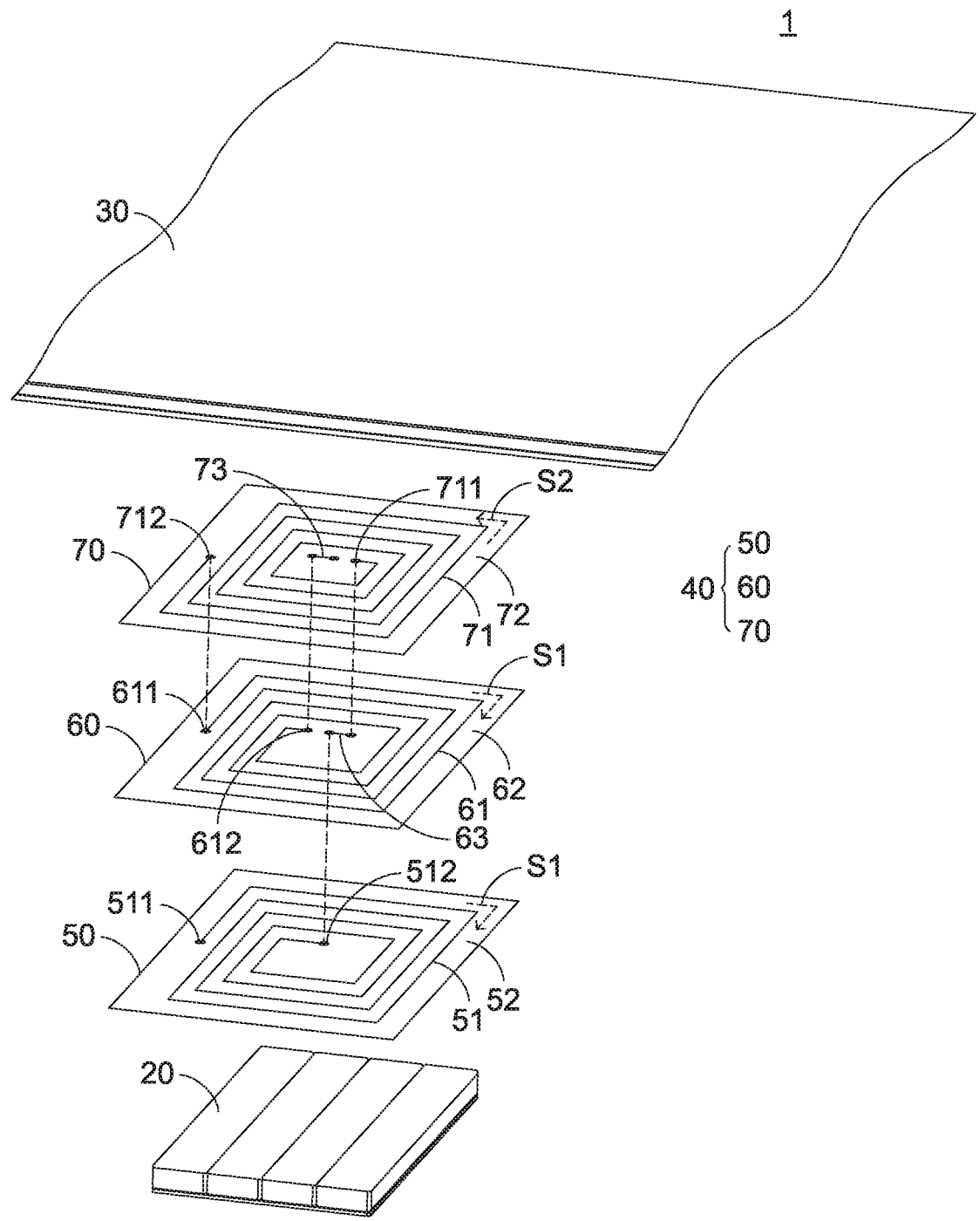
FIG. 4 is a schematic exploded view illustrating sensing lines in the magnetic board of the touch module according to the first embodiment of the present invention.

The structure of the magnetic board 40 will be described in more details as follows. FIG. 4 is a schematic exploded view illustrating sensing lines in the magnetic board of the touch module according to the first embodiment of the present invention. As shown in FIG. 4, the magnetic board 40 comprises a first wiring layer 50, a second wiring layer 60 and a third wiring layer 70. The first wiring layer 50, the second wiring layer 60 and the third wiring layer 70 are in parallel with each other and stacked on each other. Moreover, the first wiring layer 50, the second wiring layer 60 and the third wiring layer 70 are aligned with the magnet 20. Preferably, the first wiring layer 50, the second wiring layer 60 and the third wiring layer 70 are sequentially stacked as the magnetic board 40. Moreover, the first wiring layer 50 is located beside the magnet 20, and the third wiring layer 70 is located beside the touchpad 30. The second wiring layer 60 is located over the first wiring layer 50. Moreover, the second wiring layer 60 is arranged between the first wiring layer 50 and the third wiring layer 70.

The first wiring layer 50 of the magnetic board 40 comprises a first sensing line 51 and a first layer body 52. The first sensing line 51 comprises a first contacting terminal 511 and a first conducting terminal 512. The second wiring layer 60 of the magnetic board 40 comprises a second sensing line 61, a second layer body 62 and a second-layer connection part 63. The second sensing line 61 comprises a second contacting terminal 611 and a second conducting terminal 612. The third wiring layer 70 of the magnetic board 40 comprises a third sensing line 71, a third layer body 72 and a third-layer connection part 73. The third sensing line 71 comprises a third contacting terminal 711 and a third conducting terminal 712.

After the first sensing line 51 of the first wiring layer 50 is connected with the third sensing line 71 of the third wiring layer 70, the third sensing line 71 of the third wiring layer 70 is connected with the second sensing line 61 of the second wiring layer 60. That is, the first sensing line 51 of the first wiring layer 50 is not directly connected with the second sensing line 61 of the second wiring layer 60. The first sensing line 51, the second sensing line 61 and the third sensing line 71 are in parallel with each other and stacked on each other. Moreover, the first sensing line 51, the second sensing line 61 and the third sensing line 71 are aligned with the magnet 20. When electricity flows through the first sensing line 51, the second sensing line 61 and the third sensing line 71 of the magnetic board 40, the magnetic field of the magnet 20 is sensed by the first sensing line 51, the second sensing line 61 and the third sensing line 71. Consequently, the magnetic board 40 generates the vibrating effect.

The first sensing line 51 of the first wiring layer 50 is wound in the first layer body 52 of the first wiring layer 50 in a first direction S1. That is, the first sensing line 51 of the first wiring layer 50 is wound as a coil in the first layer body 52. The third sensing line 71 of the third wiring layer 70 is wound in the third layer body 72 of the third wiring layer 70 in a second direction S2. That is, the third sensing line 71 of the third wiring layer 70 is wound as a coil in the third layer body 72. The first direction Si and the second direction S2 are opposite. That is, the winding direction of the first sensing line 51 and the winding direction of the third sensing line 71 are different. For example, the first direction Si (i.e., the winding direction of the first sensing line 51) is a clockwise direction, and the second direction S2 (i.e., the winding direction of the third sensing line 71) is a counter-clockwise direction. The second sensing line 61 of the second wiring layer 60 is wound in the second layer body 62 of the second wiring layer 60 in the first direction S1 or the second direction S2. In this embodiment, the second sensing line 61 of the second wiring layer 60 is wound in the first direction S1, and the second sensing line 61 is wound as a coil in the second layer body 62. Moreover, the first layer body 52, the second layer body 62 and the third layer body 72 are in parallel with each other and stacked on each other. The first layer body 52 is located beside the magnet 20. The third layer body 72 is located beside the touchpad 30. Moreover, the second layer body 62 is arranged between the first layer body 52 and the third layer body 72.

In the first wiring layer 50, the first contacting terminal 511 and the first conducting terminal 512 of the first sensing line 51 are connected with each other through the first sensing line 51. In the second wiring layer 60, the second contacting terminal 611 and the second conducting terminal 612 of the second sensing line 61 are connected with each other through the second sensing line 61. However, the second-layer connection part 63 of the second wiring layer 60 is not connected with the second sensing line 61. In the third wiring layer 70, the third contacting terminal 711 and the third conducting terminal 712 of the third sensing line 71 are connected with each other through the third sensing line 71. However, the third-layer connection part 73 of the third wiring layer 70 is not connected with the third sensing line 71.

The connecting relationships between the sensing lines of the magnetic board 40 will be described in more details as follows. The first contacting terminal 511 of the first sensing line 51 is formed in the first wiring layer 50. The first conducting terminal 512 of the first sensing line 51 is connected with the third contacting terminal 711 of the third sensing line 71. That is, the first conducting terminal 512 of the first sensing line 51 is connected with the third contacting terminal 711 of the third sensing line 71 through the second-layer connection part 63 of the second wiring layer 60. Consequently, the first sensing line 51 of the first wiring layer 50 can be transferred across the second wiring layer 60 and connected with the third sensing line 71 of the third wiring layer 70. Moreover, the third sensing line 71 is connected with the second contacting terminal 611 of the second sensing line 61 through the third conducting terminal 712. Consequently, the third sensing line 71 is connected with the second sensing line 61. The second conducting terminal 612 of the second sensing line 61 is formed in the second wiring layer 60. The second sensing line 61 is connected with the third-layer connection part 73 of the third wiring layer 70 through the second conducting terminal 612. Consequently, the second sensing line 61 is further connected with the third wiring layer 70. The third-layer connection part 73 is further connected with another coil (not shown) or another component (not shown).

The contacting terminals, the conducting terminals and the connection parts of the first sensing line 51, the second sensing line 61 and the third sensing line 71 are connected with each other through a welding process, through conductive holes or through conductive adhesives.

Figure 5:
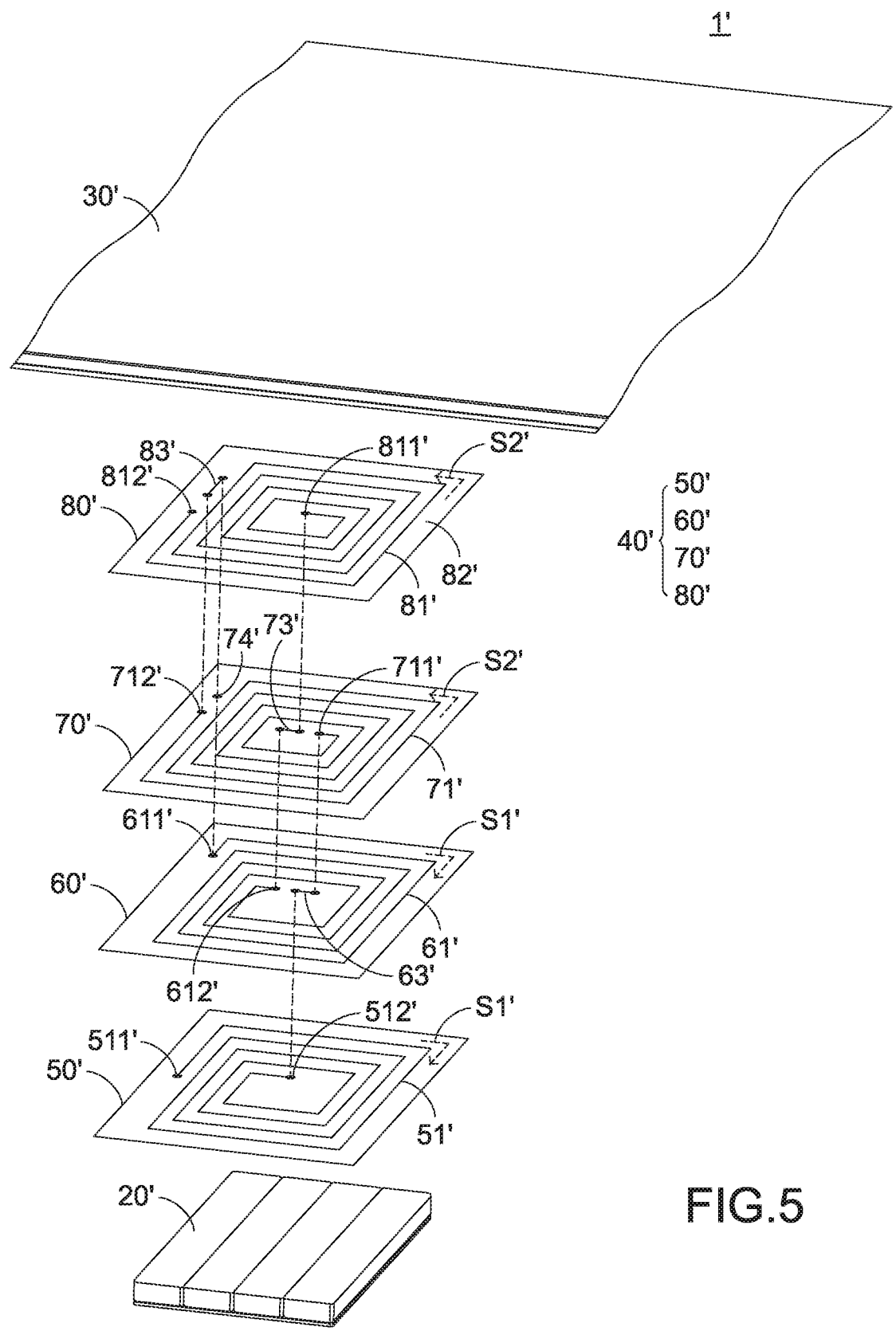
FIG. 5 is a schematic exploded view illustrating sensing lines in the magnetic board of the touch module according to the first embodiment of the present invention.

The present invention further provides a touch module of a second embodiment. FIG. 5 is a schematic exploded view illustrating sensing lines in the magnetic board of the touch module according to the first embodiment of the present invention. The operations and components of the touch module of the second embodiment that are similar to those of the first embodiment are not redundantly described herein. In comparison with the first embodiment, the structure and the connecting relationship of the magnetic board 40' of the second embodiment are distinguished.

In the second embodiment, the touch module 1' comprises a magnet 20', a touchpad 30' and a magnetic board 40'. The touchpad 30' is located over the magnet 20'. Moreover, the magnet 20' is covered by the touchpad 30'. The magnetic board 40' is arranged between the magnet 20' and the touchpad 30'. Moreover, the magnet 20' is covered by the magnetic board 40'.

The magnetic board 40' comprises a first wiring layer 50', a second wiring layer 60', a third wiring layer 70' and a fourth wiring layer 80'. The first wiring layer 50', the second wiring layer 60', the third wiring layer 70' and the fourth wiring layer 80' are in parallel with each other and stacked on each other. The first wiring layer 50' is located beside the magnet 20'. The second wiring layer 60' is located over the first wiring layer 50'. The third wiring layer 70' is located over the second wiring layer 60'. The fourth wiring layer 80' is located over the third wiring layer 70'. Moreover, the fourth wiring layer 80' is located beside the touchpad 30'.

The first wiring layer 50' of the magnetic board 40' comprises a first sensing line 51'. The first sensing line 51' is wound as a coil in a first direction S1'. The first sensing line 51' comprises a first contacting terminal 511' and a first conducting terminal 512'.

The second wiring layer 60' of the magnetic board 40' comprises a second sensing line 61' and a second-layer connection part 63'. The second sensing line 61' is wound as a coil in the first direction S1'. The second sensing line 61' comprises a second contacting terminal 611' and a second conducting terminal 612'. The second sensing line 61' is not connected with the second-layer connection part 63'.

The third wiring layer 70' of the magnetic board 40' comprises a third sensing line 71', a third-layer connection part 73' and a third-layer communication part 74'. The third sensing line 71' is wound as a coil in a second direction S2'. The third sensing line 71' comprises a third contacting terminal 711' and a third conducting terminal 712'. The third sensing line 71' is not connected with the third-layer connection part 73' and the third-layer communication part 74'.

The fourth wiring layer 80' of the magnetic board 40' comprises a fourth sensing line 81', a fourth layer body 82' and a fourth-layer connection part 83'. The fourth sensing line 81' comprises a fourth contacting terminal 811' and a fourth conducting terminal 812'. The fourth layer body 82' of the fourth wiring layer 80' and the third wiring layer 70' are in parallel with each other and stacked on each other. The fourth sensing line 81' is wound in the fourth layer body 82' in the first direction S1' or the second direction S2' and wound as a coil. In this embodiment, the fourth sensing line 81' is wound in the second direction S2'. Moreover, the fourth sensing line 81' is not connected with the fourth-layer connection part 83'.

The connecting relationships between the sensing lines of the magnetic board 40' will be described in more details as follows. The first contacting terminal 511' of the first sensing line 51' of the first wiring layer 50' is formed in the first wiring layer 50'. The first conducting terminal 512' of the first sensing line 51' is connected with the third contacting terminal 711' of the third sensing line 71' through the second-layer connection part 63' of the second wiring layer 60'. Consequently, the first sensing line 51' of the first wiring layer 50' can be transferred across the second wiring layer 60' and connected with the third sensing line 71' of the third wiring layer 70'. Moreover, after the third conducting terminal 712' of the third sensing line 71' is connected with the fourth-layer connection part 83' of the fourth wiring layer 80', the fourth-layer connection part 83' is connected with the third-layer communication part 74' of the third wiring layer 70'. Then, the third-layer communication part 74' is connected with the second contacting terminal 611' of the second sensing line 61' of the second wiring layer 60'. That is, the third sensing line 71' is transferred across the fourth wiring layer 80' and the third wiring layer 70' sequentially and then connected with the second sensing line 61'. Afterwards, the second conducting terminal 612' of the second sensing line 61' is connected with the fourth contacting terminal 811' of the fourth sensing line 81' of the fourth wiring layer 80' through the third-layer connection part 73' of the third wiring layer 70'. The fourth conducting terminal 812' of the fourth sensing line 81' is further connected with another coil (not shown) or another component (not shown).

The contacting terminals, the conducting terminals and the connection parts of the first sensing line 51', the second sensing line 61', the third sensing line 71' and the fourth sensing line 81' are connected with each other through a welding process, through conductive holes or through conductive adhesives.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A touch module, comprising:
   a base plate comprising a top side;
   a magnet located at the top side of the base plate;
   a touchpad located over the top side of the base plate, wherein the magnet is covered by the touchpad; and
   a magnetic board arranged between the touchpad and the magnet, wherein the magnet is covered by the magnetic board, and the magnetic board comprises:
   a first wiring layer located beside the magnet, wherein the first wiring layer comprises a first sensing line, the first sensing line is wound in the first wiring layer in a first direction, and the first sensing line comprises a first contacting terminal and a first conducting terminal;
   a second wiring layer located over the first wiring layer, wherein the second wiring layer comprises a second sensing line, and the second sensing line comprises a second contacting terminal and a second conducting terminal; and
   a third wiring layer located over the second wiring layer, and located near the touchpad, wherein the third wiring layer comprises a third sensing line, the third sensing line is wound in the third wiring layer in a second direction, and the third sensing line comprises a third contacting terminal and a third conducting terminal,
   wherein the third wiring layer further comprises a third-layer connection part, wherein the third-layer connection part is not connected with the third sensing line, and the second conducting terminal of the second sensing line is connected with the third-layer connection part,
   wherein the first wiring layer, the second wiring layer and the third wiring layer are in parallel with each other and stacked on each other, and the first wiring layer, the second wiring layer and the third wiring layer are aligned with the magnet,
   wherein the first contacting terminal of the first sensing line is formed in the first wiring layer, the first conducting terminal of the first sensing line is connected with the third contacting terminal of the third sensing line such that the first sensing line is connected with the third sensing line, the third conducting terminal of the third sensing line is connected with the second contacting terminal of the second sensing line such that the third sensing line is connected with the second sensing line, and the second conducting terminal of the second sensing line is formed in the second wiring layer,
   wherein the first sensing line, the second sensing line and the third sensing line sense a magnetic field of the magnet and generates a vibrating effect.

2. The touch module according to claim 1, wherein the first sensing line of the first wiring layer is connected with the third sensing line of the third wiring layer through the third sensing line of the third wiring layer.

3. The touch module according to claim 1, wherein the first sensing line, the second sensing line and the third sensing line are in parallel with each other and stacked on each other, and the first sensing line, the second sensing line and the third sensing line are aligned with the magnet.

4. The touch module according to claim 1, wherein the first contacting terminal and the first conducting terminal of the first sensing line are connected with each other through the first sensing line, the second contacting terminal and the second conducting terminal of the second sensing line are connected with each other through the second sensing line, and the third contacting terminal and the third conducting terminal of the third sensing line are connected with each other through the third sensing line.

5. The touch module according to claim 1, wherein the first wiring layer further comprises a first layer body, the second wiring layer further comprises a second layer body, and the third wiring layer further comprises a third layer body, wherein the first layer body, the second layer body and the third layer body are in parallel with each other and stacked on each other, the first layer body is located beside the magnet, and the third layer body is located beside the touchpad.

6. The touch module according to claim 5, wherein the first sensing line is wound in the first layer body of the first wiring layer in the first direction, the third sensing line is wound in the third layer body of the third wiring layer in the second direction, and the second sensing line is wound in the second layer body of the second wiring layer in the first direction or the second direction.

7. The touch module according to claim 1, wherein the second wiring layer further comprises a second-layer connection part, wherein the second-layer connection part is not connected with the second sensing line, and the first conducting terminal of the first sensing line is connected with the third contacting terminal of the third sensing line through the second-layer connection part of the second wiring layer.

8. The touch module according to claim 1, wherein the top side of the base plate comprises a concave structure, and the magnet is disposed within the concave structure.

9. The touch module according to claim 1, wherein the base plate further comprises a supporting part, wherein the supporting part is installed on the top side of the base plate, and the supporting part is contacted with the touchpad.

10. The touch module according to claim 9, wherein the supporting part of the base plate comprises a first supporting piece, a second supporting piece, a third supporting piece and a fourth supporting piece, wherein the first supporting piece, the second supporting piece, the third supporting piece and the fourth supporting piece are installed on the top side of the base plate and arranged around the magnet.

11. The touch module according to claim 1, wherein the magnetic board further comprises a fourth wiring layer, wherein the fourth wiring layer is located over the third wiring layer, the fourth wiring layer comprises a fourth sensing line, and the fourth sensing line comprises a fourth contacting terminal and a fourth conducting terminal.

12. The touch module according to claim 11, wherein the fourth wiring layer further comprises a fourth layer body, and the fourth sensing line is wound in the fourth layer body in the first direction or the second direction.

13. The touch module according to claim 11, wherein the fourth wiring layer further comprises a fourth-layer connection part, wherein the fourth-layer connection part is not connected with the fourth sensing line, and the third conducting terminal of the third sensing line is connected with the second contacting terminal of the second sensing line through the fourth-layer connection part.

\* \* \* \* \*